(12) United States Patent
Karafiat

(10) Patent No.: US 9,063,579 B2
(45) Date of Patent: Jun. 23, 2015

(54) METHOD AND DEVICE FOR INPUTTING TEXTS

(75) Inventor: Laszlo Karafiat, Viszak (HU)

(73) Assignee: General Algorithms Ltd., London (GB)

( * ) Notice: Subject to any disclaimer, the term of this patent is extended or adjusted under 35 U.S.C. 154(b) by 709 days.

(21) Appl. No.: 13/051,536

(22) Filed: Mar. 18, 2011

(65) Prior Publication Data

US 2011/0173575 A1    Jul. 14, 2011

Related U.S. Application Data

(63) Continuation of application No. PCT/EP2009/062564, filed on Sep. 28, 2009.

(30) Foreign Application Priority Data

Sep. 26, 2008  (EP) .................................. 08165323

(51) Int. Cl.
*G06F 3/033*    (2013.01)
*G06F 3/023*    (2006.01)
*G06F 3/0488*   (2013.01)

(52) U.S. Cl.
CPC .......... *G06F 3/0233* (2013.01); *G06F 3/04883* (2013.01)

(58) Field of Classification Search
CPC ................... G06F 3/017; G06F 2203/04807
USPC ........ 715/779, 810, 806, 764, 863, 857, 231, 715/816, 773, 856, 866; 345/168, 156, 157, 345/159
See application file for complete search history.

(56) References Cited

U.S. PATENT DOCUMENTS

| 5,574,482 | A    | 11/1996 | Niemeier |
| 8,405,601 | B1 * | 3/2013  | Beale ............................ 345/156 |
| 2004/0104896 | A1 * | 6/2004 | Suraqui ........................ 345/168 |
| 2004/0120583 | A1 | 6/2004 | Zhai |
| 2004/0140956 | A1 | 7/2004 | Kushler et al. |
| 2005/0146508 | A1 | 7/2005 | Kirkland et al. |

(Continued)

FOREIGN PATENT DOCUMENTS

| EP | 1555601 | 7/2005 |
| WO | 2004/063833 | 7/2004 |

OTHER PUBLICATIONS

International Search Report issued by the EPO as International Searching Authority for corresponding International Application No. PCT/EP2009/062564 with mail date of Jan. 28, 2010.

*Primary Examiner* — Kieu Vu
*Assistant Examiner* — Joy M Weber
(74) *Attorney, Agent, or Firm* — Myers Wolin, LLC

(57) ABSTRACT

There is disclosed a method for the detection of the selection of a character of a character string to be input from a character set on an input surface, wherein the selection of at least one character of the character string is detected by evaluating a direction vector of a gesture which is input on the input surface. There is also disclosed an input device for carrying out the method, especially a mobile terminal with a touch-sensitive input surface for selecting characters of a character string to be input, in which on the touch-sensitive input surface an input pattern with a number of characters from a character set can be displayed, whereby the input device comprises an evaluation unit, which detects the selection of at least one character of the character string by evaluating a direction vector of a gesture input with an input medium on the input surface.

15 Claims, 7 Drawing Sheets dogs

(56) References Cited

U.S. PATENT DOCUMENTS

Figure 1A:
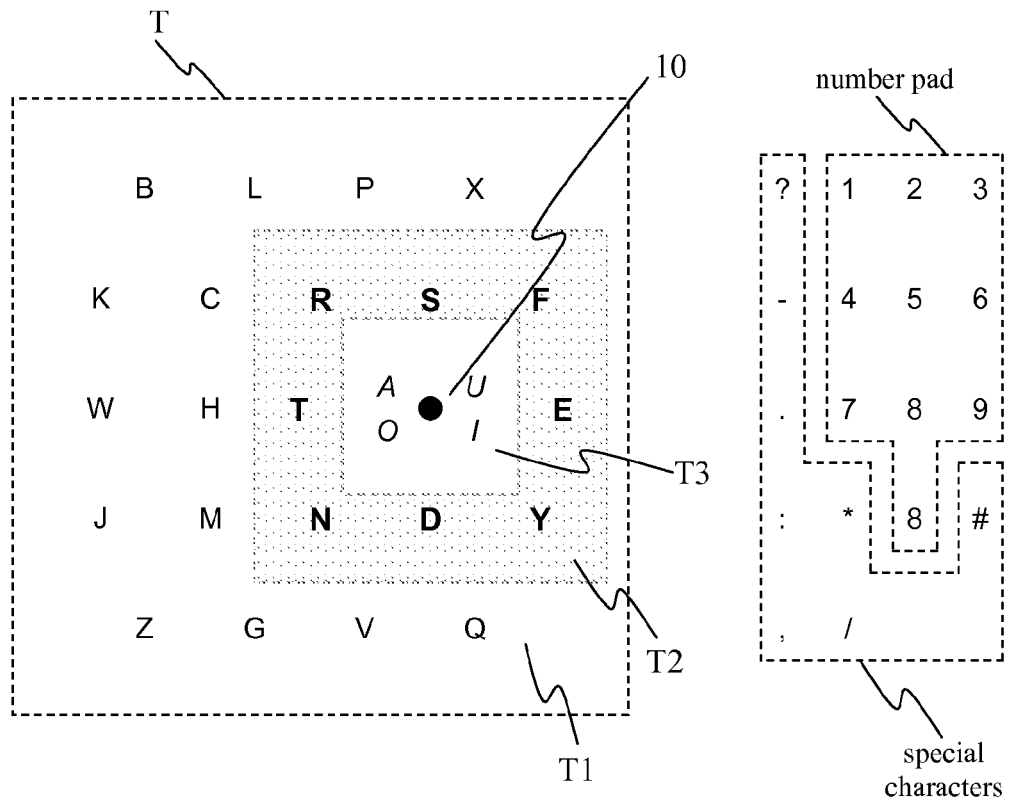

| | | |
|---|---|---|
| 2006/0082540 A1 | 4/2006 | Prior |
| 2007/0152979 A1* | 7/2007 | Jobs et al. .................... 345/173 |
| 2008/0015841 A1* | 1/2008 | Longe et al. .................... 704/1 |
| 2009/0251420 A1* | 10/2009 | Do et al. ...................... 345/173 |
| 2011/0037718 A1* | 2/2011 | Stephanick et al. .......... 345/173 |

* cited by examiner

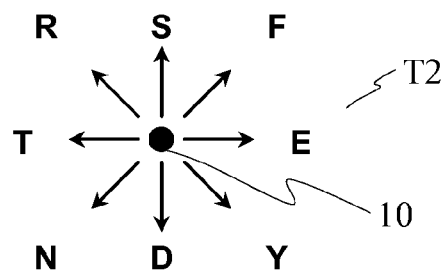
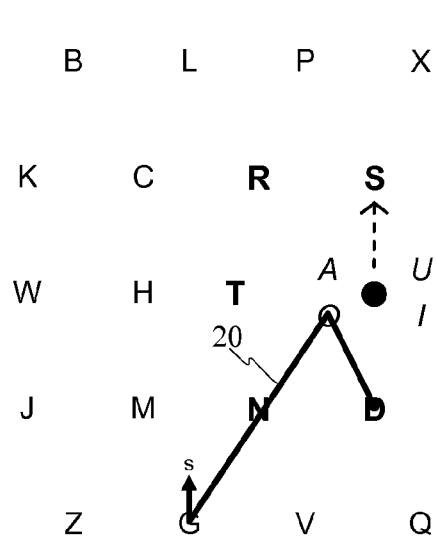
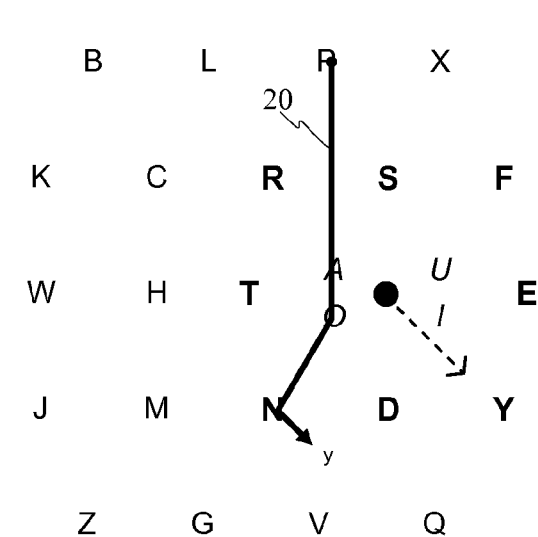
Fig. 2b                        Fig. 2c
dogs                        pony
Fig. 2d
bed

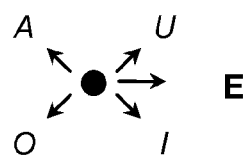
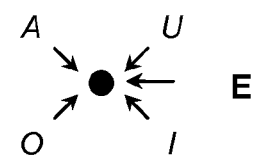
Fig. 3aFig. 3b
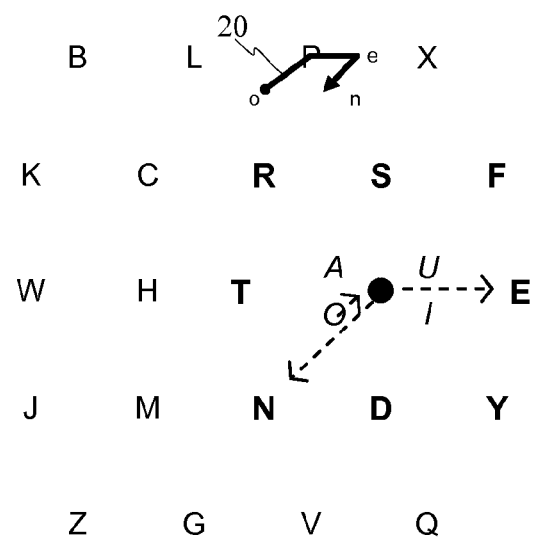
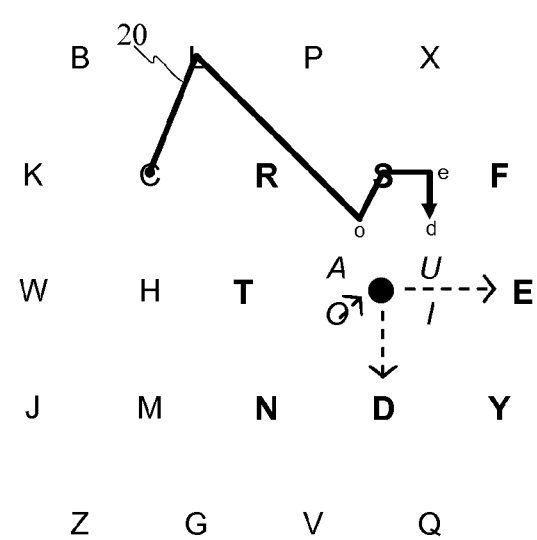
Fig. 3cFig. 3d
openclosed worry McGraw we're passer-by Sincerely yours

METHOD AND DEVICE FOR INPUTTING TEXTS

CROSS REFERENCE TO RELATED APPLICATIONS

This application is a continuation of PCT/EP2009/062564 filed on Sep. 28, 2009, which claims priority to EP Application No. 8165323.0 filed Sep. 26, 2008, the contents of each of which are incorporated herein by reference.

FIELD OF THE INVENTION

The invention relates to a method and a device, especially a mobile terminal, for inputting texts by means of an input medium, wherein the characters destined for text input are visualized on an input template.

STATE OF THE ART

Such methods and devices are known from prior art. For example methods are known for the input without keyboard of letters by means of a stylus on a display equipped with a touchscreen. The input of a text takes place by typing (the so-called multistroke) on a small keyboard visualized on the display. Such touchscreens, in which the input of a text is done by means of a visualized keyboard, are used in information terminals, for example on fairs or for timetable information in train stations. In the mobile sector such touchscreens are preferably used for PDAs (Personal Digital Assistant), tablet PCs or game consoles.

Moreover it is known from prior art to input a word on a touchscreen by connecting (the so-called Unistroke) the characters constituting the word, in which the connecting of the characters is done by a continuous movement of an input medium from a character to the next character of the word to be input.

The methods known from prior art for text input on a touchscreen by Unistroke have in common that the input speed depends on the length of the path between the single characters of a word. This was realized already in 1954 by Fitts, who from this deduced the speed for inputting a word consisting of several characters. Fitts postulated among others that the time for connecting or touching one after the other two characters on a touchscreen with the help of an input medium depends on the distance between the two characters as well as on the size of the input surface of the second character to be connected. This relation is generally known as Fitts' Law, in which $$t_m = a + b \cdot \log_2(d/w+1)$$

applies, whereby
- $t_m$ is the time for the movement of the input medium from the starting character to the target character;
- a and b are experimental parameters to be defined of the individual human operating efficiency;
- d is the distance from the starting character to the center of the input surface of the target character; and
- w is the width of the input surface of the target character.

Fitts' Law states that the input speed for inputting texts, wherein the input is done by connecting or by touching one after the other the characters constituting the texts, is limited upwards. Only human capacity (the parameters a and b) has an influence on the input speed of the texts.

Several methods known from prior art try to overcome this upper limit of the input speed given by Fitts' Law.

For example from EP 1 555 601 A2 a method for inputting texts on an input template is known, wherein the characters constituting the word are connected one after the other. So this method for inputting texts as for the input speed is limited upwards according to Fitts' Law, since all the characters constituting the word must be connected to each other. This upper limit of the input speed was tried to be overcome by making available a so-called Look-Up-function. In this way the user of the system, after the input of a determined number of characters, is given a number of words which can be selected for the completion of the input (the so-called auto-completion). By this method, however, the upper limit according to Fitts' Law is not overcome. On the one hand it cannot be ensured that the Look-Up-function also delivers correct propositions, on the other hand at least the input characters are subject to the condition according to Fitts' Law, i.e. at least the characters to be input must be connected, so that for this purpose there is an upper speed limit.

Moreover from US 2004/01 20583 a method for the input of a character string is known, whereby the input of the character string is done by connecting the characters constituting the character string. The input of the character string, which can be detected with the aid of a recognition method (e.g. Pattern-Matching), is based on the input of a character string that can also take place without an input template. This entails that an ideograph (an ideograph is a graphics that describes a complete word) can correspond to several words, so that after the input of the ideographs the user is given a list of words from which the user can select the real word to be input. Since the ideograph corresponds to a connection of the characters constituting the word and since in case of an ambiguity of an ideograph another input by the users is necessary, the upper limit according to Fitts' Law according to this method on average is even worse than an input of character string, in which case simply all characters of a word are connected one after the other.

An improvement of the input speed is tried to be reached by the fact that an ideograph assigned to a word is independent of the size of the ideograph. In this way, however, only the distance between the characters of the word described by the ideograph varies. Therefore admittedly the input speed can be improved, the upper limit of the input speed is however still preset by Fitts' Law, since also small ideographs correspond to a connection of characters of a word.

The method has moreover the disadvantage that all the ideographs must be learnt, if the input is done without input template. Another disadvantage consists of the fact that the input ideographs have to be analysed and processed by means of computation-intensive algorithms (e.g. pattern recognition, pattern scaling for standardizing the input, pattern matching, Look-Up algorithms for the access to internal dictionaries) and by powerful hardware, in order to detect the corresponding respective word, however it cannot be ensured that the detected word is really the word wanted by the user of the system. Thus, the system also offers means for selecting, in case of ambiguities or inaccuracies, in the input, a corresponding word out of a number of possible words. The requisite of powerful computing units is especially disadvantageous if the text input is to be provided on a mobile terminal.

From US 2004/01 40 956 A1 a method for inputting texts is known, in which also all the characters must be touched on a template, so that here too the upper limit as for the input speed corresponds to the upper limit according to Fitts' Law. In order to compensate inaccuracies during the input, also this method proposes to offer, in case of ambiguities, a corresponding selection of words, out of which then the corresponding word can be selected, so that this additional input entails that also in this method the upper limit of the input speed on average is worse than the upper limit according to Fitts' Law.

This method is based on a matching algorithm, which compares the input ideograph with words stored in a database or with the ideographs assigned to these words. This requires powerful hardware for pattern matching as well as an enormous memory for memorizing the words and the ideographs assigned to the words.

All the methods known from prior art are based on the so-called unistroke method (connecting all characters of a word by the continuous movement of the input medium). Moreover all the methods known from prior art try to reach an acceleration of the input by means of a Look-Up method, for example Dictionary-Look-Up, which, however, does not entail that the input speed according to Fitts' Law can be improved. In some cases even the contrary is the case, since the selection of the proposed words requires an additional input and therefore the medium maximum input speed is on average even worse than the maximum input speed according to Fitts' Law.

OBJECT OF THE INVENTION

Therefore, the object of the present invention is to provide a method and a device, with which an intuitive and faster input of whole words can take place.

SOLUTION OF THE INVENTION

In order to solve this object, a method for the detection of the selection of a character of a character string to be input out of a character set on an input surface is provided, wherein the selection of at least one character of the character string may be detected by evaluating a direction vector of a gesture, which is input on the input surface.

The advantage consists of the fact that by evaluating a gesture, or the direction vector, connecting characters is avoided, which leads to a shortening of the input path on the input surface.

The selection of at least one character of the character string out of the character set may be detected by evaluating a change of direction of a gesture, which is input on an area assigned to the character of the input surface.

The character set may comprise at least two disjoint subsets, wherein the change of direction for characters from the first subset is evaluated, and wherein the direction vector for the selection of a character from the second subset is evaluated.

It is particularly advantageous, if the direction vector may be evaluated with respect to a reference point on the input surface, by assigning a position vector to the direction vector with the reference point as an origin point or as a end point.

The reference point may be used as a selection assistant for the selection of the next character, which is arranged in the direction of the position vector.

In one embodiment the character set may include characters of the alphabet of a predetermined language, whereas the second subset may include endings of the words in the predetermined language. In this way whole endings may be selected by evaluating the direction vector of a gesture.

The endings may include the eight most frequent last characters of the words and/or may include the eight most frequent suffixes of the words.

A position vector from a set of sixteen position vectors may be assigned to the direction vector, wherein the direction of the position vector corresponds to the direction of the direction vector and whereby a character from the second subset is assigned to the origin point or the end point of the sixteen position vectors.

The assignment of a direction vector to a position vector may be done in case of position vectors with the same direction depending on the fact whether the input gesture corresponds to the selection of the last character of the word, in that the lifting-off of the input medium from the input surface is detected.

Preferably on the input surface an input template with the characters of the character set may be visualized.

The input gestures may form an ideograph describing the word, in which the ideograph may be evaluated by evaluating the gestures constituting the ideograph.

The input of a point on the area assigned to a character of the input surface and/or the input of a perpendicular line on the area assigned to a character of the input surface may be evaluated as a gesture, assigning to this gesture, depending on the character, a predetermined character string. In this way advantageously whole character strings may be input or selected with only one gesture.

Moreover, for the solution of the object, a mobile terminal with a touch-sensitive input surface for selecting characters of a character string to be input is provided, whereby on the touch-sensitive input surface an input template with a number of characters from a character set may be displayed, whereby the input device comprises an evaluation unit which detects the selection of at least one character of the character string by evaluating a direction vector of a gesture, which is input with an input medium on the input surface.

It is advantageous if the touch-sensitive input surface comprises areas assigned to the characters, wherein the evaluation unit detects the selection of at least one character of the character string by evaluating a change of direction of a gesture, which is input with the input medium on an area assigned to the character.

It is particularly advantageous if the character set comprises at least two disjoint subsets, wherein the evaluation unit evaluates the change of direction of a gesture for characters from the first subset and evaluates the direction vector for the selection of a character from the second subset.

On the input template a reference point may be visualized, wherein the evaluation unit evaluates the direction vector with respect to the reference point, in that to the direction vector a position vector from a set of sixteen position vectors may be assigned, with the reference point as an origin point or as a end point, whereby the direction of the position vector corresponds to the direction of the direction vector and whereby a character from the second subset may be assigned to the origin point or the end point of the sixteen position vectors.

In an advantageous embodiment of the input device the evaluation unit, in case of position vectors with the same direction, assigns the direction vector to that position vector, depending on the fact whether the input gesture corresponds to the selection of the last character of the word, the lifting-off of the input medium from the input surface being detectable by the evaluation unit.

SHORT DESCRIPTION OF THE DRAWINGS

Figure 1B:
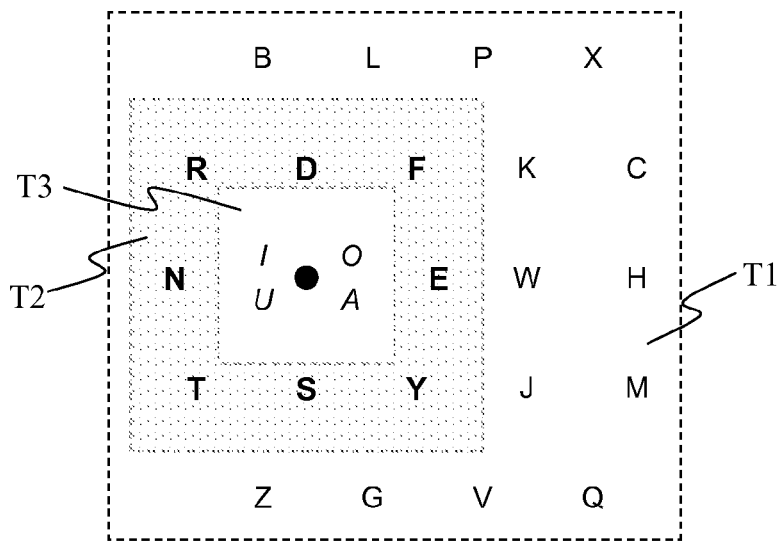
Figure 4:
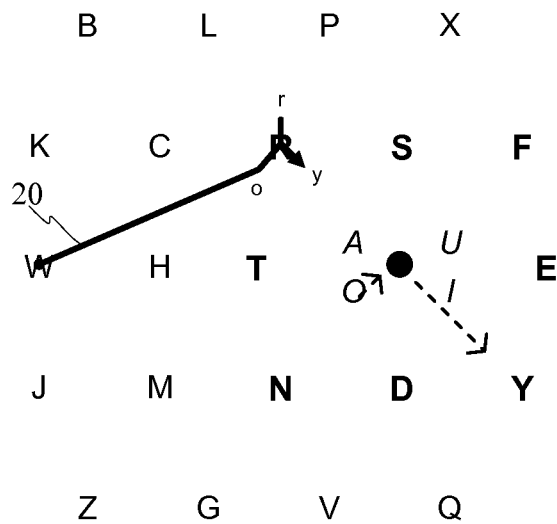
Figure 5:
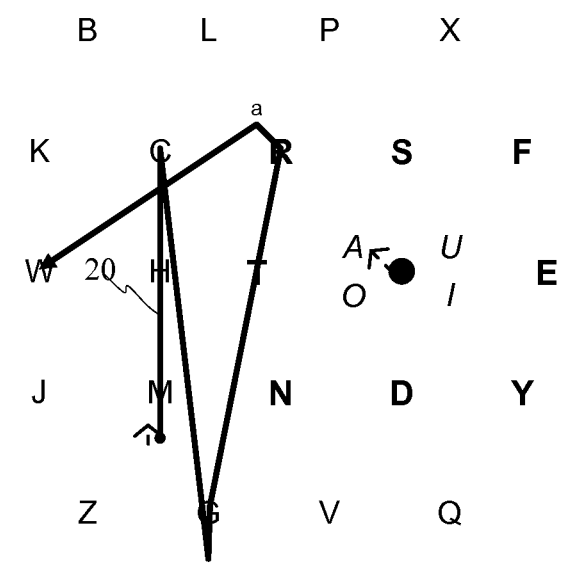
Figure 6:
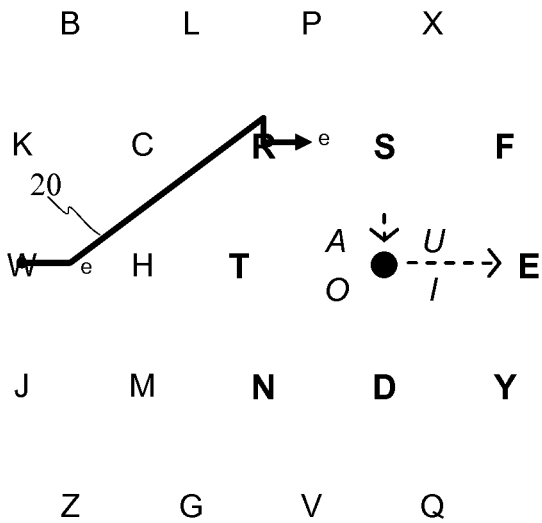
Figure 8:
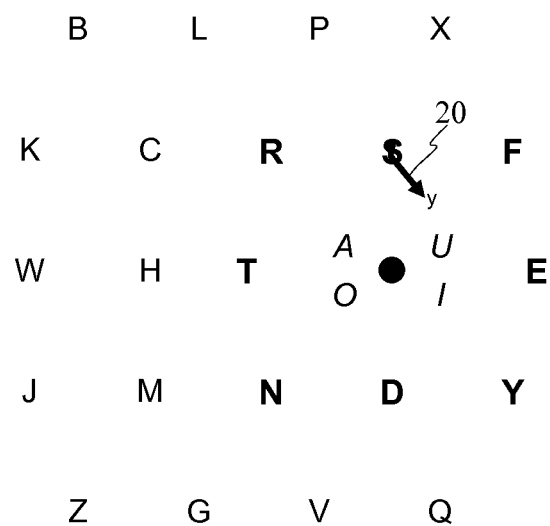
Figure 9:
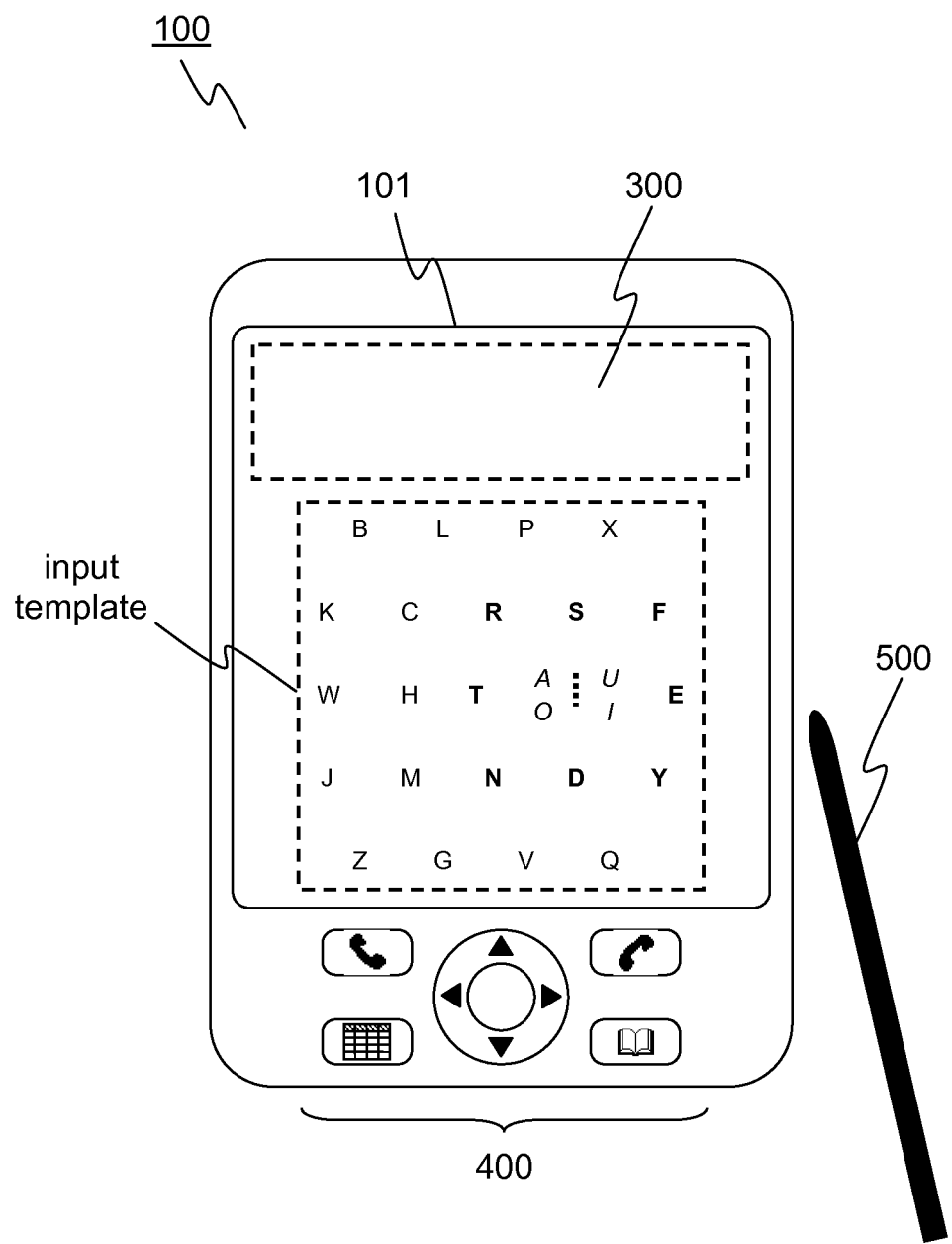

The invention is described in more detail by means of the drawing and preferred embodiments. The figures show:

FIG. 1a an embodiment of an input template for use in the method according to the invention;

FIG. 1b an input template according to the invention with an alternative arrangement of the characters;

FIG. 2a a detail of an input template with the most frequent last characters in a language of words in an arrangement according to the invention avoiding the input of last characters;

FIGS. 2b-2d examples for the input of a word avoiding the input of the last characters;

FIG. 3a, 3b a detail of an input template with an arrangement according to the invention of vowels for avoiding the input of the vowels during the input of a word;

FIG. 3c, 3d examples for the input of a word avoiding the input of the vowels in the word;

FIG. 4 examples for the input of a word, in which there is a double consonant;

FIG. 5 examples for the input of a word, in which there are capitals;

FIG. 6, 7 examples for the input of a word, in which there are special characters;

FIG. 8 an example for the input of phrases with the aid of particular gestures; and FIG. 9 a mobile terminal, which is formed for the use of the method according to the invention.

EMBODIMENTS OF THE INVENTION

By the invention a method and a device for inputting texts by means of an input medium are provided, wherein the characters necessary for text input are visualized on an input template.

First some terms are defined, as they are used in the following description of the figures and in the embodiments, respectively.

ideograph or ideogram—an ideograph or ideogram is a graphics which represents a complete word.

gesture—gestures are the characteristic parts of an ideograph. An ideograph is formed of at least one gesture.

input medium—an input medium serves for the input of the ideograph or the gestures on an input template, for example a touch pad. The input medium can be e.g. a stylus or a finger.

The input of a word is done by inputting an ideograph representing the word on the input template with an input medium. The ideograph is generated by the continuous movement of an input medium on the input template. A part of the ideograph or a part of the word to be input is generated or input by connecting the characters constituting the word. Another part of the ideograph is generated by inputting gestures, in which by inputting gestures is prevented that characters during the input of the ideograph have to touch the input medium, by which a higher input speed is achieved.

The input of a gesture as a component of the ideograph thus replaces the connection of a character with the following character. The number of the gestures is very small (in an embodiment as described below, only 16 different gestures are necessary, cf. FIG. 2a, FIG. 3a and FIG. 3b), which nevertheless leads to a doubling of the input speed as to Fitts' Law. The gestures are very simple and thus can also be learned very simply.

FIG. 1a shows an input template T for the input of a character string with a preferred arrangement of the characters of the English alphabet. The following examples or facts are based each time on the English language, or on the vocabulary of the English language. The method according to the invention, however, can be used with any language.

The input template T in this embodiment comprises all the characters which can be used to form a word. In an embodiment of the invention the characters visualized on the input template T are subdivided into two disjoint subsets, wherein the first subset T1 comprises characters selected by connecting, i.e. by directly touching the input medium, and the second subset (T2, T3) comprises characters which are selected by a gesture, without the character to be selected having to directly touch the input medium.

In a further embodiment of the invention the characters visualized on the input template T are subdivided into three disjoint subsets T1, T2 and T3. The subset T3 comprises the vowels A, I, O and U and the subset T2 comprises the eight last characters most frequent in the English language. The subset T1 comprises the residual characters on the input template. The characters of the subset T1 are selected by directly touching the input medium. The characters of the subsets T2 and T3 are selected by inputting a gesture, without the character to be selected directly having to touch the input medium.

The arrangement of the characters within the subset T1 on the input template T is not important for the method according to the invention. When forming a word by connecting the characters constituting the word, the characters from the subset T1 have to be connected on the input template with the input medium, for example a stylus.

The arrangement of the characters inside the subsets T2 and T3 on the input template are, on the other hand, particularly important for the method according to the invention.

In the input template T shown in FIG. 1a a reference point 10 is shown, around which the characters from the subset T2 and from the subset T3 are arranged. The reference point 10 in this respect constitutes the center of the input template as for the subsets T2 and T3. The reference point 10 serves here as an input aid for the selection of a character from the subsets T2 and T3, in that the reference point 10 represents the current character selected with the stylus from the subset T1 or the next character to be selected from the subset T1. If the input medium is situated on the letter "W", the reference point 10 represents the letter "W". This will be explained in more detail in the following examples.

For example, a movement of the input medium from the reference point 10 upwards is interpreted as a movement towards the character "S". Since the reference point 10 represents the current character selected with the input medium from the subset T1, a movement of the input medium for example from the letter "W" upwards is interpreted as a selection of the character "S", without the input medium having to be conducted from the character "W" to the character "S". The result hereof would be the character string "WS" or "ws".

A movement of the input medium from the reference point 10 downwards to the left has therefore as a consequence that this could be interpreted as a selection of the character "O" or the character "N" (since both characters are situated on the left below the reference point). This ambiguity of the selection is avoided, however, by the fact that the characters from the subset T2 represent the last characters of a word, whereas the characters from the subset T3 represent vowels in a word.

Since the input of a word is finished by lifting the input medium off the input template T, the underlying system can recognize unequivocally if, for example, the movement of the input medium downwards to the left deals with a character inside a word or a last character. Therefore, a movement downwards to the left with the following lifting of the input medium off the input template T is to be interpreted as an input of the character "N", whereas a movement of the input medium downwards to the left with the following movement of the input medium towards the next character of the word is interpreted as a selection of the vowel "O". Examples of this are shown in the following figures.

On a sensitive input surface besides the input template T further characters can be made available for input. For example FIG. 1a shows, besides the input template T, a number pad as well as several special characters, which are available for the input of a text.

FIG. 1b shows an alternative arrangement of the subsets T2 and T3 on an input template as well as an alternative arrangement of the characters within the subsets T2 and T3.

This arrangement entails that a movement of the input medium, for example from the letter "W" upwards, would lead to the character string "WD" or "wd".

A change in the arrangement of the single characters in the respective subsets thus entails that a gesture is assigned to a selection of another character.

The arrangement according to FIG. 1a is particularly advantageous for left-handers, whereas the arrangement according to FIG. 1b is particularly advantageous for right-handers, since the subsets T2 and T3 during the input are not covered by the hand. This is advantageous above all for quickly learning the input method, which can be seen in connection with the description of the following figures, since the input template serves at the same time as a model for the gestures as well. Gestures, therefore, do not have to be learned any longer.

FIG. 2a shows an arrangement of the characters from the subset T2. The characters of the subset T2 are the eight last characters most frequent in the English language. These last characters are arranged around the reference point 10 in such a way that a movement of the input medium from the current selected character in a determined direction can be assigned definitely as a movement towards one of this eight characters.

These eight possible movements are visualized in FIG. 2a as arrows, the reference point corresponding to the current selected character. Thus for example the movement of an input medium from the reference point 10 upwards corresponds to the selection of the character "S", a movement of the input medium downwards to the left for example corresponds to the selection of the character "N", if the movement downwards to the left does not lead to a selection of the next character but ends with the lifting-off of the input medium.

The assignment of the single characters to a movement of the input medium in a certain direction is not important; what is important is only that a movement of the input medium in a certain direction can be assigned exactly to a character.

The reference point 10 here represents the last selected character from the subset T1 (or from the subset T3).

Thus, for example, a movement of the input medium from the letter "W" upwards would correspond to the selection of the character "S" as the next character of the word to be input. Since the character from the subset T2 is the last character of a word, a movement of the input medium in one of the eight directions based on a character with the following lifting of the input medium off the input template can definitely be interpreted as a selection of the corresponding last character. The input medium does not have to be conducted anymore from the last but one character of a word to the last character, since a (short) movement of the input medium starting from the last but one character is interpreted as a movement starting from the reference point 10 in the direction of the last character. These short movements are in the following called gestures. The input path for inputting a word, which ends in a character from the subset T2, can thus be shortened almost by the length of the partial path from the last but one character to the last character, which increases the input speed.

As an alternative to the last characters, the eight most frequent suffixes can also be used. This is advantageous for example for those languages, in which the words frequently end in the same suffixes. A suffix can be a certain combination of several characters.

In FIG. 2b and FIG. 2c two examples are shown for the input of a word which ends in a character from the subset T2. FIG. 2b shows the input path 20 for the input of the word "dogs". For the explanation of the following examples it is irrelevant if the selection of a character leads to the choice of the character with capitals or in small letters. The input of the word begins by positioning the input medium, which can be a stylus, on the letter "D". The stylus is then moved towards the character "O". At the letter "O" there is a change of direction towards the character "G". The change of direction on the letter "O" is interpreted as a selection of the character "O". On the letter "G" there is again a change of direction, which is interpreted as a selection of the character "G". The changes of direction on a character are also called gesture.

Subsequent to the selection of the character "G" there is a short movement (gesture) of the stylus upwards with a concluding lifting-off of the stylus from the input surface. This short movement of the stylus upwards is interpreted as a selection of the last character "S", since a movement from the reference point 10 of the stylus upwards (here shown by a hatched arrow) corresponds to the selection of the character "S". The reference point 10 represents the last selected letter "G". A movement of the stylus from the last but one character "G" to the last character "S" can thus be omitted. In this way the last partial path is drastically reduced.

FIG. 2c shows the input of the word "pony". The stylus is set here on the letter "P" and then led to the character "O". On the letter "O" there is a change of direction, which is interpreted as a selection of the character "O". Subsequently the stylus is led to the character "N", on which again a change of direction takes place to the choice of the character "N". Finally a short movement (gesture) of the stylus is carried out from the last but one character "N" to bottom right with a concluding lifting-off of the stylus. This short movement of the stylus to bottom right corresponds to the selection of the last character "Y". The reference point 10 in this example represents the last selected letter "N", so that a movement from the reference point 10 to bottom right corresponds to the selection of the last character "Y".

FIG. 2d shows the input of the word "bed". The input here starts by positioning the stylus on the letter "B". The stylus is then drawn a bit to the right (first gesture) and subsequently a bit downwards (second gesture) with the following lifting-off of the stylus. The first gesture corresponds to the selection of the vowel "E" (the selection of the vowels is described more closely in connection with FIGS. 3a to 3d). The second gesture downwards again corresponds to the selection of the final character "D", since the reference point represents the last but one letter "E", so that a movement from the reference point downwards corresponds to the selection of the character "D".

In the English vocabulary ca. 78% of the words end in the eight last characters listed here, so that the shortening of the input path alone leads, as for these eight last characters, to a significant improvement of the input speed, since the path need not lead up to the last character of the word. The direction suggestion in the form of a short gesture to the last character is sufficient, wherein the direction suggestion is interpreted starting from the reference point 10. Since the eight last characters are visualized on the input template together with the reference point, these eight different gestures need not be learnt.

FIG. 3a and FIG. 3b show the arrangement of the vowels of the subset T3 as well as of the vowel E in relation to the reference point 10. In the evaluation of the movement of the stylus a distinction is made, if the stylus is moved from the reference point 10 to a vowel (FIG. 3a) or if the stylus is moved from the vowel to the reference point 10 (FIG. 3b). In the movement of the stylus from the reference point 10 to the vowels (FIG. 3a) the reference point represents the last selected character. I.e. a movement from the last character, for example towards top left, is interpreted as a selection of the vowel "A".

In a movement of the stylus from a not explicitly selected vowel to the reference point 10 the reference point 10 is interpreted as the next selected character. In this way the explicit input of vowels can be avoided also in case of words which begin with a vowel.

Both these possibilities for the selection of vowels are described in more detail together with FIGS. 3c and 3d.

FIG. 3c and FIG. 3d show two examples which illustrate how, during the input of words, the explicit input of vowels can be avoided.

FIG. 3c shows the input path 20 for the input of the word "open". Since this word begins with the vowel "O", the stylus is put according to the arrangement of the vowel "O" in relation to the reference point 10 on the left below the character "P" and then moved from there to the character "P". A movement of the stylus from bottom left (gesture) to a character corresponds to a movement of the stylus from the vowel "O" to the reference point 10. The reference point 10 represents the next letter to be input "P", so that in this example the letter string "OP" is deduced. Next on the letter "P" there is a change of direction and the stylus is conducted a bit from the character P to the right (gesture), which according to the arrangement of the vowels in FIG. 3a corresponds to the selection of the character "E". Another change of direction as well as a short movement of the stylus downwards to the left (gesture) with a concluding lifting-off of the stylus from the input surface corresponds, as already shown in connection with FIG. 2a to FIG. 2d, to the selection of the last character "N". With this method additionally inputting vowels during the input of a word is avoided.

FIG. 3d shows an input path for the input of the word "closed". The stylus is put on the first letter "C" and then moved to the character "L". On the letter "L" for selecting the character "L" a change of direction takes place. Afterwards the stylus is moved into the area on the left below the character "S", where the next change of direction takes place. The stylus is then moved from bottom left into the letter "S". A movement of the stylus from bottom left into the letter "S" corresponds, according to FIG. 3b, to the selection of the vowel "O" with the following selection of the character "S". At the letter "S" there is the next change of direction, which leads to the selection of the character "S". Afterwards the stylus is moved from the character "S" to the right, which corresponds to the selection of the vowel "E" according to FIG. 3a. Finally, the stylus is drawn a bit downwards, and then lifted from the input surface, which corresponds to the selection of the last character "D".

According to the methods shown in FIG. 3a to FIG. 3d, the explicit input or the connecting of vowels can be efficiently avoided. In the English language roughly 40% of the characters of a text are vowels, so that avoiding the inputting of vowels entails an enormous speed advantage during the input of texts.

FIG. 4 shows an input path for the input of a word with a double character inside a word. Here the input of the English word "worry" is shown. The input of the letters "W" and "O" as well as of the final character "Y" is done as already described in connection with FIG. 2a to FIG. 3d. The input of the double consonant "RR" is done by moving the stylus a bit (gesture) from the character "R" upwards and then again back to the character "R". This gesture is interpreted as a doubling of the selected character.

From the arrangement of the vowels around the reference point 10 (cf. FIG. 3b) it results that for the input of a vowel before the next character to be input five gestures are available, i.e. the gestures from bottom left, from top right, from top left, from bottom right and from the right. The three available gestures, i.e. from the top, from the left and from the bottom offer a further shortening of the input path.

Figure 7:
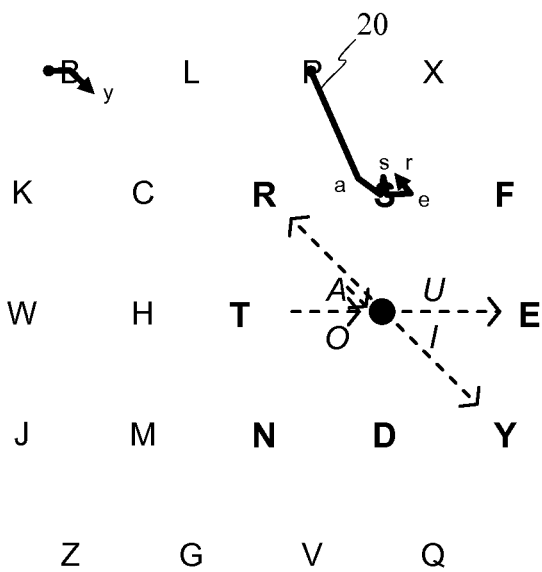

An example for using these three gestures is described in more detail now in connection with FIGS. 5 to 7.

FIG. 5 shows an input path of a word, where both at the beginning and in the word there are capitals. In this example it is supposed that the input of a word is normally done with lower cases. The movement of the stylus from below the character into the character (gesture from below according to FIG. 3b) is interpreted as a selection of the corresponding character as a capital letter. So the input of the word "McGraw" begins shortly below the character "M". The movement of the stylus from the bottom into the letter "M" induces the selection of the character "M" as a capital. The same applies for the selection of the character "G" as a capital. Here the stylus is led from the character "C" below the character "G" and then from there into the letter "G" (gesture). The selection of the residual characters, especially of the vowel "A", takes place according to the selection described in FIGS. 2a to 3d.

FIG. 6 shows the input path for a word like for example "we're", where there is an apostrophe in the word. The input of an apostrophe can be realized by moving the stylus on the character which is to be preceded by an apostrophe, from the top into the character (gesture from the top according to FIG. 3b).

FIG. 7 shows the input path for a word, like for example "passer-by", which comprises a hyphen. The input of the hyphen can take place by reaching the character that is to be preceded the hyphen, from the left (gesture from the left according to FIG. 3b). Reaching a character from the left is evaluated as a gesture, i.e. as a gesture for inputting a hyphen. This replaces, at the same time, the automatically inserted space character. This makes it possible to fully exploit the gestures for word endings (cf. FIG. 2a) in both parts of the composed word (passer and by).

The gestures shown in FIGS. 4, 5, 6, and 7 for inputting double characters or for inputting special characters can also be replaced by other gestures, just making sure that no collision with the gestures shown in FIGS. 2a, 3a and 3b occurs.

The method shown here allows, in the English language, to reduce the input path by as much as 50% (plus 16% savings for not having to input spaces, since the spaces can be inserted automatically by lifting off the stylus). This shortening of the input path more or less corresponds to a doubling of the input speed as to that which would be reached if all the characters of the word to be input were selected by connection.

Moreover, for inputting texts, no complex gestures have to be learned, since all the characters, which are necessary for the input of a text, are visualized on the input template. Additionally, the display of a reference point 10 and the corresponding arrangement of the characters from the subsets T2 and T3 around this reference point 10 supports the user in the selection of the next character (i.e. during the input of the corresponding gesture) or of the last character of a word. Therefore, the user has to learn only a few gestures, like for example the gestures for double characters or the gesture for the insertion of inverted commas or a hyphen.

Another advantage of this method is that with it also the already known methods for inputting texts by connecting the characters that form a word can be realized, since the movements of the stylus according to the movements shown in FIG. 2, FIG. 3a, and FIG. 3b must be interpreted by the system only if a corresponding movement does not lead to a following character. This allows the users a gentle switching from a known method to the method according to the invention, which significantly increases the acceptance of the method according to the invention.

Besides the gestures already described, additional gestures can be provided, which further increase input speed. Two types of these additional gestures are described in more detail.

A first of these additional gestures is the simple touching of a character with the following lifting of the stylus from the input surface. In this way it is possible to input the 26 most used words by simply touching a character. Additionally, an immediate lifting of the stylus is interpreted as a confirmation of the input of the word assigned to the character, so that a separate confirmation is not needed.

A selection of possible correspondences (of English words) to single characters is shown in the following table 1 in column A. The assignment of words to single characters can be determined individually by the user. Determined words need not be assigned to any characters, as they are already selected by the simple input of a gesture described above. For example the word "on" can be selected by moving the stylus from bottom left into the letter "N".

TABLE 1

| Character | Column A | Column B |
|---|---|---|
| A | a | About |
| B | but | because |
| C | can | Could |
| D | down | different |
| E | even | Each |
| F | for | From |
| G | good | Going |
| H | have | Him |
| I | I | Into |
| J | just | Job |
| K | know | Knew |
| L | like | Last |
| M | more | Most |
| N | and | now |
| O | other | only |
| P | people | part |
| Q | quite | question |
| R | are | right |
| S | she | said |
| T | the | that |
| U | you | used |
| V | very | voice |
| W | with | which |
| X | next | text |
| Y | your | years |
| Z | was | zone |

Another of these additional gestures is the input of a vertical stroke directly on a character. With this gesture more of the most used words can be selected. A selection of possible correspondences (of English words) to single characters during the input of a vertical stroke as a gesture is shown in table 1 in column B. Here, too, the assignment can be determined individually by the user.

In FIG. 8 an example of a further gesture is shown, which represents an extension of the just described gesture "vertical stroke" and with which whole word sequences can be selected by inputting a simple and short gesture. These gestures are here called macro gestures.

A macro gesture is begun by the input of a vertical stroke directly on a character. The stylus is then drawn, without lifting the stylus from the input surface, to one or several further characters. After the input of the vertical stroke another of the gestures described above can also be input. The input of a macro gesture can take place in such a way by simply connecting characters and/or by a combination of further gestures.

FIG. 8 shows—as an example—the input of the English word sequence "see you later" with the aid of a macro gesture, wherein the macro gesture is finished with a gesture for the selection of a last character (cf. FIG. 2a). A vertical stroke on the letter "S" is interpreted as the beginning of a macro gesture. After the input of the vertical stroke, the stylus is led out of the letter "S" to bottom right, and afterwards lifted from the input surface. The leading out to bottom right with the following lifting-off of the stylus is interpreted as a selection of the last character. The gesture on the bottom right as the last character is interpreted as a selection of the character "Y" (cf. FIG. 2a). Thus, in this example, the result is the character combination "SY", which is interpreted as a macro gesture. To this character combination for example the word sequence "Sincerely yours" or "see you later" can be assigned.

With the aid of macro gestures, which can be freely defined by the user, for example frequently occurring phrases can be defined. This further increases the input speed of texts. Together with the gestures described above, a triplication of input speed—as to the known multistroke method—derives.

The macro gestures also have benefits compared to known Look-Up methods (e.g. Dictionary-Look-Up). A conventional Dictionary-Look-Up can take place only after the input of at least three (mostly four) characters, because otherwise too many alternatives would have to be offered. To a macro gesture, on the other hand, exactly one word or one word sequence is assigned.

The macro gestures can be stored in the terminal for example in the form of XML files. In this way these macro gestures can be exchanged with other terminals.

FIG. 9 shows a mobile terminal which is adapted for carrying out the method according to the invention. The mobile terminal 100 presents a touch-sensitive screen 101, on which in a lower area an input template, as it is shown in FIG. 1a, is visualized. In an upper area of the screen 101 a result field 300 is visualized, in which the selected characters, or the selected word, or the words are visualized. By means of a stylus 500, according to the method according to the invention, the characters of a word to be input are connected to each other, in which as for the selection of the characters from the subsets T2 and T3 only a short movement (gesture) towards the next character to be selected has to be carried out, wherein the direction has to be selected in such a way that there is a movement from the reference point 10 to the character to be selected or in the case according to the variant shown in FIG. 3b from the vowel to be selected to the next character.

The mobile terminal can provide additional input means or selection means 400. The mobile terminal can be, for example, a mobile phone, a tablet PC or a PDA.

The input template shown in FIG. 1 and FIG. 8 is suitable especially for left-handers, since the characters assigned to the subsets T2 and T3 are visualized in the right middle area of the input template. Of course, the characters of the subsets T2 and T3 can be visualized in the left area of the input template as well, so that the input of a word according to the method of the invention is also advantageous for right-handers. For this purpose the mobile terminal can offer a switching possibility, by which the input template can be switched over between the operation for left or right-handers.

A particular advantage of the method according to the invention is that the mobile terminal does not need any special or additional arithmetic and logic unit in order to analyse the input paths done by means of the stylus on the input template and assign them to a word. The selection of a character with the stylus 500 can be unambiguously detected. The arithmetic and logic unit must only recognize movements, i.e. gestures of the stylus, as shown in FIGS. 2a, 3a and 3b, which, based on the very small number of possibilities, can be done easily even with a conventional, arithmetic and logic unit situated in a mobile terminal.

The detection of gestures in all the aforementioned examples is confined to the detection of changes of direction during the movement of the stylus on the input surface. In other languages, however, gestures like loops, waves and the like may be necessary. Their detection can be done by means of known algorithms. A gesture recognized in this way, e.g. a wave, can be a component of an ideograph describing a word, in which the ideograph can also contain the gestures according to the invention, which can be detected with the method according to the invention, in order to select the appertaining signs or characters.

I claim:

1. A method for detecting a selection of at least one character of a character string to be input from a character set on an input surface the method comprising:
    accepting as input a gesture on the input surface, the gesture having an origin point and an end point, and
    evaluating a direction of the gesture to produce a direction vector of the gesture,
    wherein the selection of at least one character of the character string is detected by evaluating the origin point of or the end point of the direction vector of the gesture,
    wherein the direction vector is evaluated with respect to a reference point on the input surface, the reference point being the origin point of the direction vector,
    wherein the reference point constitutes the center of a reference template, the reference template comprising all the characters which can be used to form a word, and wherein the origin point of the gesture is the current character selected and wherein neither of the origin point of or the end point of the gesture is the reference point, and
    wherein the end point of the gesture is at a detected location of a lifting of an input medium off the input surface and the end point of the direction vector is at the next character to be selected.

2. The method of claim 1, further comprising:
    evaluating a change of direction of the gesture,
    wherein the selection of one of the at least one character of the character string from the character set is detected by evaluating the change of direction of the gesture, which is input on an area of the input surface assigned to the character.

3. The method of claim 2, wherein the character set comprises at least two disjoint subsets, wherein the change of direction is evaluated for characters from a first subset, and wherein the direction vector is evaluated for the selection of a character from a second subset.

4. The method of claim 3, wherein a position vector from a set of sixteen position vectors is assigned to the direction vector, wherein the direction of the position vector corresponds to the direction of the direction vector and wherein an origin point or an end point of each vector within the sixteen position vectors is assigned to a character from the second subset.

5. The method of claim 4, wherein the assignment of the direction vector to the position vector in case of multiple potential position vectors is done depending on whether the input gesture corresponds to the selection of a last character of a word, determined by detecting a lifting of an input medium off the input surface.

6. The method of claim 1, wherein the character set comprises characters of an alphabet of a predetermined language, and wherein a second subset comprises endings of words in the predetermined language.

7. The method of claim 6, wherein the endings comprise eight most frequent last characters of the words or eight most frequent suffixes of the words.

8. The method of claim 1, further comprising displaying an input pattern on the input surface with the characters of the character set.

9. The method of claim 1, wherein the input gestures form an ideograph describing a word, the ideograph being evaluated by evaluating the gestures constituting the ideograph.

10. The method of claim 1, wherein the input of a point on an area of the input surface assigned to the character or the input of a vertical stroke on an area of the input surface assigned to the character is evaluated as the gesture, wherein a predetermined character string is assigned to the gesture depending on the character.

11. An input device comprising:
    a touch-sensitive input surface for selecting characters of a character string to be input, and
    an evaluation unit for detecting the selection of at least one character of the character string,
    wherein an input pattern with a number of characters from a character set is displayable on the touch-sensitive input surface,
    wherein the evaluation unit detects the selection of at least one character of the character string by evaluating a direction vector produced by evaluating a gesture input with an input medium on the input surface,
    wherein the direction vector is evaluated with respect to a reference point on the input surface, the reference point being an origin point of the direction vector,
    wherein the reference point constitutes the center of a reference template, the reference template comprising all the characters which can be used to form a word, and wherein an origin point of the gesture is the current character selected and wherein neither the origin point of or an end point of the gesture is the reference point, and
    wherein the end point of the gesture is at a detected location of a lifting of the input medium off the touch-sensitive input surface, and wherein an end point of the direction vector is at the next character to be selected.

12. The input device of claim 11, wherein the touch-sensitive input surface comprises areas assigned to the characters, wherein the evaluation unit detects the selection of at least one character of the character string by evaluating a change of direction of the gesture that is input with the input medium on an area assigned to the character.

13. The input device of claim 12, wherein the character set comprises at least two disjoint subsets, and wherein the evaluation unit evaluates the change of direction of the gesture for characters from a first subset and evaluates the direction vector for the selection of the character from a second subset.

14. The input device of claim 11, wherein a reference point is visualized on the input pattern, and wherein the evaluation unit evaluates the direction vector with respect to the reference point, where the evaluation comprises assigning a position vector to the direction vector from a set of sixteen position vectors with the reference point as an origin point or as an end point, wherein a direction of the position vector corresponds to a direction of the direction vector and wherein to the origin point or to the end point of the sixteen position vectors a character from a second subset can be assigned.

15. The input device of claim 14, wherein the evaluation unit, in case of position vectors with the same direction, assigns the direction vector to a corresponding position vector, depending on whether the input gesture corresponds to the selection of a last character of a word, a lifting of the input medium off the input surface being detectable by the evaluation unit.

* * * * *